United States Patent
Stamps et al.

(10) Patent No.: US 8,360,727 B2
(45) Date of Patent: Jan. 29, 2013

(54) YOKE AND BEARING FITTING ASSEMBLY FOR ROTORS

(75) Inventors: Frank B. Stamps, Colleyville, TX (US);
Patrick R. Tisdale, Roanoke, TX (US);
Thomas C. Campbell, Keller, TX (US);
Richard E. Rauber, Euless, TX (US);
James L. Braswell, Jr., Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 13/144,510

(22) PCT Filed: Jan. 19, 2009

(86) PCT No.: PCT/US2009/031378
§ 371 (c)(1),
(2), (4) Date: Jul. 14, 2011

(87) PCT Pub. No.: WO2010/082935
PCT Pub. Date: Jul. 22, 2010

(65) Prior Publication Data
US 2011/0274550 A1 Nov. 10, 2011

(51) Int. Cl.
*B64C 27/37* (2006.01)
(52) U.S. Cl. .................................. 416/134 A; 416/141
(58) Field of Classification Search .................. 416/106, 416/107, 134 A, 138, 140, 141, 244 R
See application file for complete search history.

(56) References Cited

U.S. PATENT DOCUMENTS

| | | | | |
|---|---|---|---|---|
| 4,986,735 A | * | 1/1991 | Robinson | 416/134 A |
| 5,059,094 A | * | 10/1991 | Robinson et al. | 416/134 A |
| 5,110,259 A | | 5/1992 | Robinson | |
| 5,820,344 A | | 10/1998 | Hamilton et al. | |

FOREIGN PATENT DOCUMENTS

WO WO-2008/048206 A2 * 4/2008

OTHER PUBLICATIONS

International Search Report mailed by ISA/USA, U.S. Patent and Trademark Office on Mar. 4, 2009 for International Patent Application No. PCT/US09/31378.
International Preliminary Report on Patentability mailed by IPEA/USA, U.S. Patent and Trademark Office on Feb. 14, 2011 for International Patent Application No. PCT/US09/31378.

* cited by examiner

*Primary Examiner* — Christopher Verdier
(74) *Attorney, Agent, or Firm* — James E. Walton; J. Oliver Williams

(57) ABSTRACT

A yoke and bearing fitting assembly for a multi-blade aircraft rotor is disclosed. The assembly has a yoke having arms extending generally radially from a central portion of the yoke, the arms each having opposing surfaces. An aperture is formed in each arm and extends between the surfaces. A bearing fitting has a body configured for insertion into the aperture of the yoke and has two rims protruding from a periphery of the body, the body also having a bearing mount adapted for mounting a pitch change bearing assembly to the yoke. Each rim abuts one of the surfaces of the associated yoke arm when the bearing fitting is installed within the aperture, so as to create clamping forces between the rims and the arm and the arm. The bearing fitting transmits forces from the pitch bearing assembly into the yoke.

15 Claims, 5 Drawing Sheets

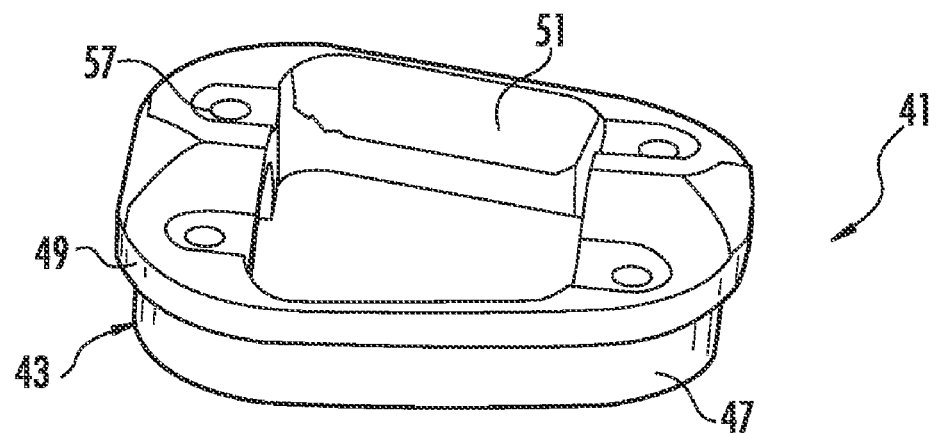
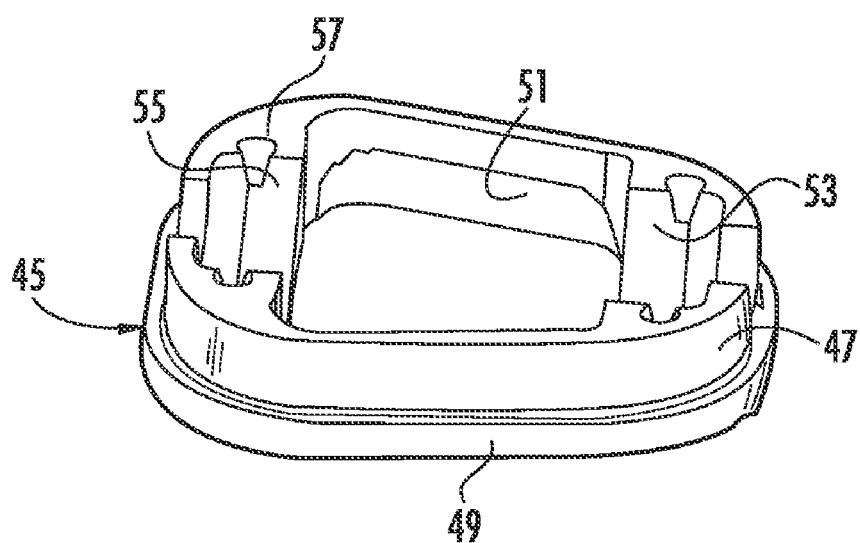
FIG. 3
(PRIOR ART)

YOKE AND BEARING FITTING ASSEMBLY FOR ROTORS

TECHNICAL FIELD

The technical field is yoke and bearing fitting assemblies for rotors.

DESCRIPTION OF PRIOR ART

Many types of multiple-blade aircraft rotors require that the blades have the ability to be rotated about a radial pitch-change axis for changing the angle of attack, or pitch, of the blade during operation of the rotor. Adjustable-pitch rotors may be used on fixed-wing aircraft or rotary-wing aircraft, such as helicopters or tiltrotors.

In the configuration shown in FIGS. 1 and 2, a rotor assembly 11 comprises a yoke 13 and a central hub assembly 15. Hub assembly 15 is used to pivotally attach yoke 13 to a mast (not shown), allowing the mast to rotate rotor assembly 11 about mast axis 17. In the configuration shown, hub 15 allows for yoke 13 to gimbal about flapping axes relative to the mast.

Yoke 13 comprises multiple arms 19 extending radially outward from a central portion of yoke 13, and yoke 13 has three arms 19 in the configuration shown. Each arm 19 is used to connect a blade assembly (not shown) to yoke 13 for movement with yoke 13 about mast axis 17. Each blade assembly has a blade grip that attaches to each arm 19 at an inboard pitch-change bearing assembly 21 and at an outboard pitch-change bearing assembly 23. Bearing assemblies 21, 23 define a pitch axis 25 for each blade assembly, about which the blade assemblies may be rotated to adjust the pitch of the blades. Each outboard bearing assembly 23 is carried on a spindle 27 that is connected to an outboard end of each arm 19 of yoke 13, whereas each inboard bearing assembly 21 is carried in a cavity 29 formed in an inboard portion of each arm 19.

Referring specifically to FIG. 2, yoke 13 is shown with hub assembly 15 and bearing assemblies 21, 23 removed. Cavity 29 of each arm 19 comprises an aperture 31 formed in yoke 13. As shown, aperture 31 has a generally trapezoidal shape, with the vertices being rounded to limit stress concentrations. Aperture 31 has upper and lower ledges 33 formed along the edges of aperture 31. Ledges 33 are recessed from upper surface 35 of arm 19 and from lower surface 37 of arm 19 in a wedge-shaped notch 39 formed in each surface 35, 37.

To install inboard bearing assembly 21 in cavity 29 of each arm 19, a two-piece bearing fitting 41 is used. Bearing fitting 41 comprises an upper half 43 and a lower half 45, and each half 43, 45 is inserted from one side of arm 19 into aperture 31 where they are then joined together to carry inboard bearing assembly 21.

FIG. 3 is an enlarged view of bearing fitting 41 and shows detail of fitting halves 43, 45. Each half 43, 45 has a body 47 having a generally trapezoidal outer shape that is the same as aperture 31, permitting halves 43, 45 to be closely fit within aperture 31. A rim 49 extends from an outer edge of each body 47, rims 49 being formed to fit on the associated ledges 33 of cavity 29. Each half 43, 45 has a central opening 51 and one portion of round mounting cups 53, 55 (visible only in half 45). When halves 43, 45 are joined together, each body 47, opening 51, and cup 53, 55 of one of halves 43, 45 is aligned with the corresponding component in the other of halves 43, 45. Referring also to FIG. 2, two assembled bearing fittings 41 are shown in arms 19, and assembled cups 53, 55 are visible in fittings 41.

To install each bearing assembly 21 in a cavity 29, bearing assembly 21 is inserted in aperture 31, and fitting halves 43, 45 are inserted into aperture 31 from opposite sides of arm 19. Aligned cups 53, 55 provide for mounting of the inboard and outboard ends of bearing assembly 21, and aligned openings 51 provide clearance for the remaining portions of bearing assembly 21 to rotate a limited amount relative to yoke 13. Fitting halves 43, 45 are fastened together using fasteners or other means, so as to create clamping forces between rims 49 and yoke 13 and retain bearing assembly 21 in a selected position within cavity 29 along pitch axis 25. Halves 43, 45 may be attached together using fasteners (not shown) extending through both halves 43, 45, such as through aligned fastener holes 57.

While the combination of cavity 29 and bearing fittings 41 adequately serve the function of transferring forces from the blade assemblies to yoke 13, the configuration requires several machining steps to form cavity 29 in yoke 13 and on assembly requires thickness shims to ensure proper fit of the components. These steps lead to additional manufacturing time and additional cost.

BRIEF DESCRIPTION OF THE DRAWINGS

FIG. 3 is an enlarged oblique view of the prior-art bearing fitting of FIG. 2.

DESCRIPTION OF THE PREFERRED EMBODIMENT

An improved yoke and bearing fitting assembly is described below. The improved assembly reduces the number of manufacturing steps and results in decreased per-unit cost.

Figure 1:
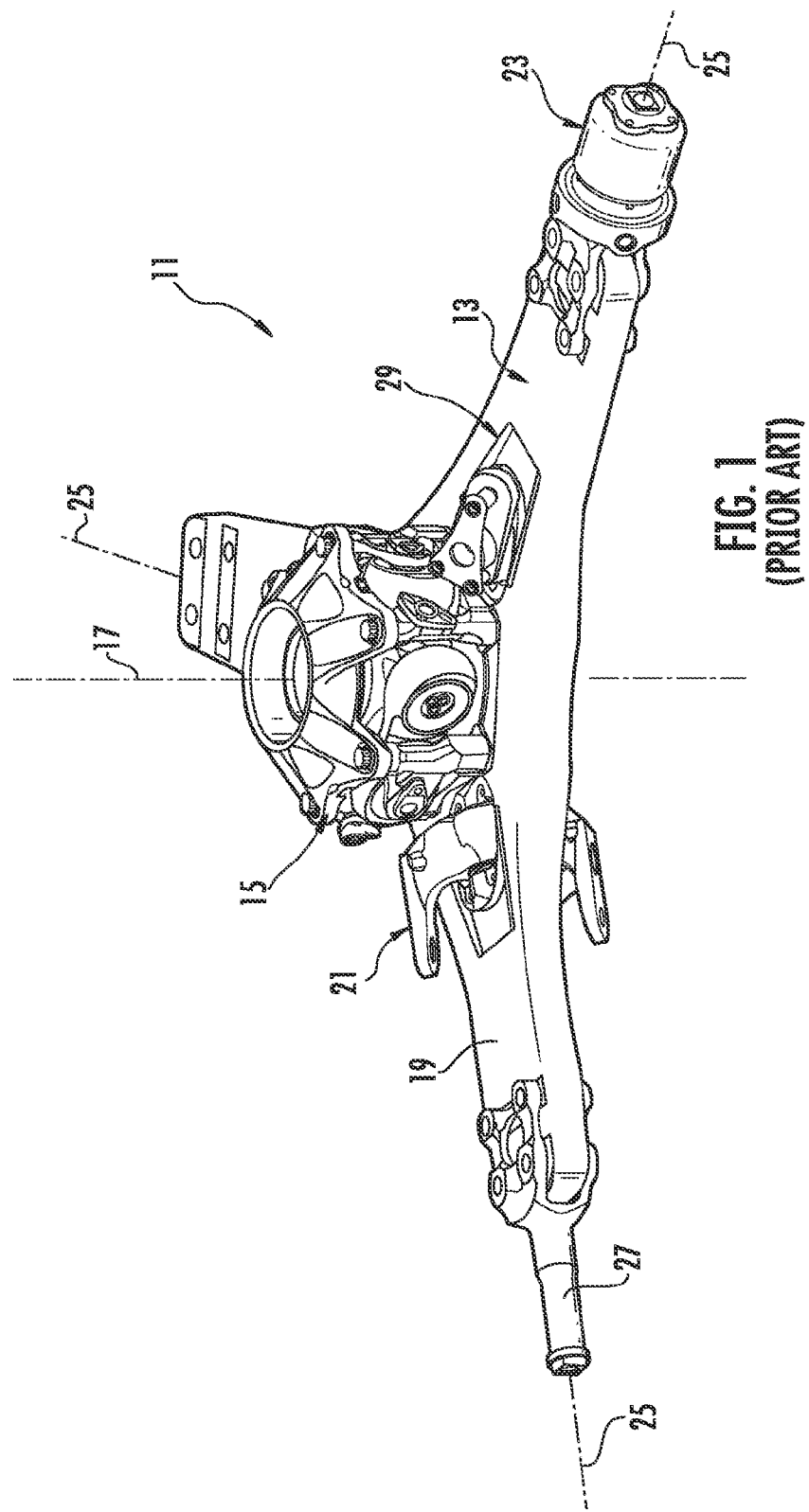
FIG. 1 is an oblique view of a portion of a prior-art rotor assembly.
Figure 2:
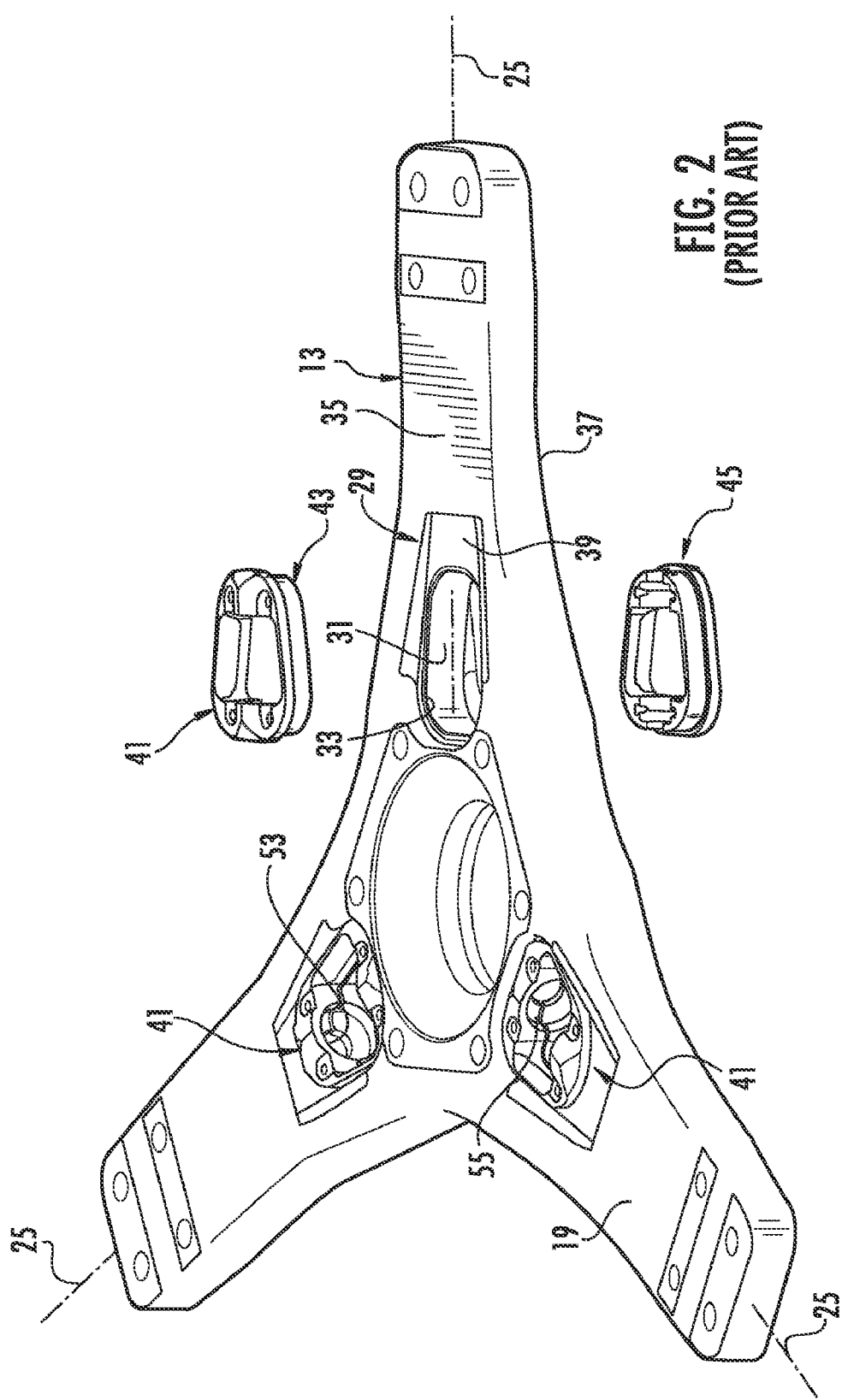
FIG. 2 is an oblique view of the prior-art yoke and bearing fitting assembly of FIG. 1.
Figure 4:
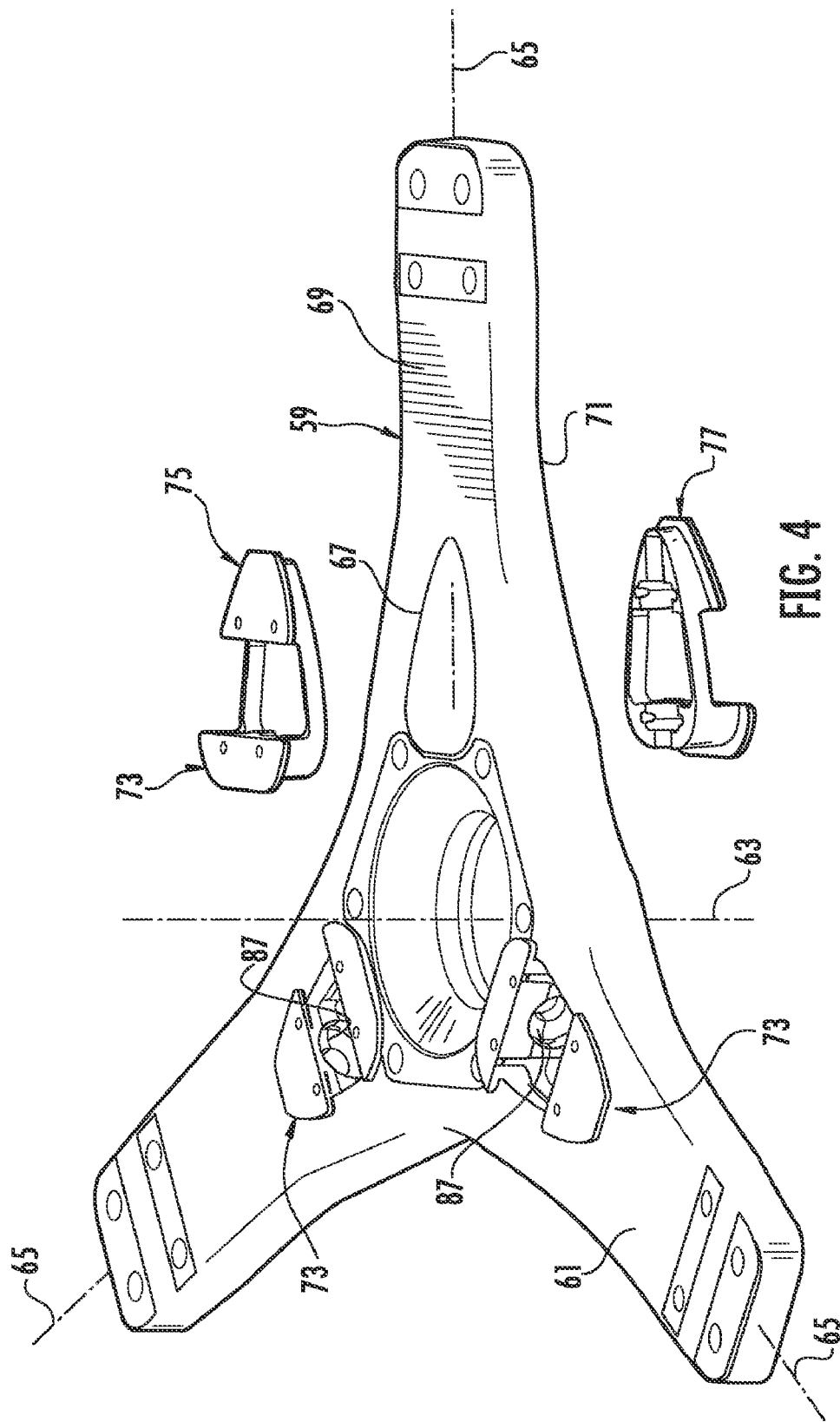
FIG. 4 is an embodiment of an improved yoke and bearing fitting assembly for a rotor assembly.

FIG. 4 shows a yoke 59 for a rotor assembly, yoke 59 being constructed similarly to yoke 13 and configured for use with hub assembly 15 and blade assemblies, as described above. Yoke 59 is intended to be a direct replacement for yoke 13 in rotor assembly 11, though minor accommodations to various components may be desired or required when using yoke 59.

Yoke 59 comprises multiple arms 61 extending radially outward from a central portion of yoke 59, and yoke 59 has three arms 61 in the configuration shown. Each arm 61 is used to connect a blade assembly (not shown) to yoke 59 for movement with yoke 59 about mast axis 63. As with rotor assembly 11, a grip of each blade assembly attaches to an outboard pitch-change bearing assembly (not shown), like assembly 23, which is connected at the outboard end of each arm 61. The grip also attaches to an inboard pitch-change bearing assembly (not shown), like assembly 21. The bearing assemblies define a pitch axis 65 for each blade assembly.

Each inboard bearing assembly is carried in an aperture 67 formed in an inboard portion of each arm 61. As shown, aperture 67 has a generally triangular shape, with the vertices being rounded to limit stress concentrations. Aperture 67 extends between upper surface 69 and an opposing lower surface 71 of arm 61. Unlike in yoke 13, aperture 67 is not recessed from surfaces 69, 71 with a notch and does not have ledges. The lack of these features eliminates the extra machining required to form these features in yoke 13 and provides for optional use shims in the assembly.

To install the inboard bearing assembly in cavity 67 of each arm 61, a two-piece bearing fitting 73 is used. Bearing fitting 73 comprises an upper half 75 and a lower half 77, and each half 75, 77 is inserted from one side of arm 61 into aperture 67 where they are then joined together to carry the inboard bearing assembly.

Figure 5:
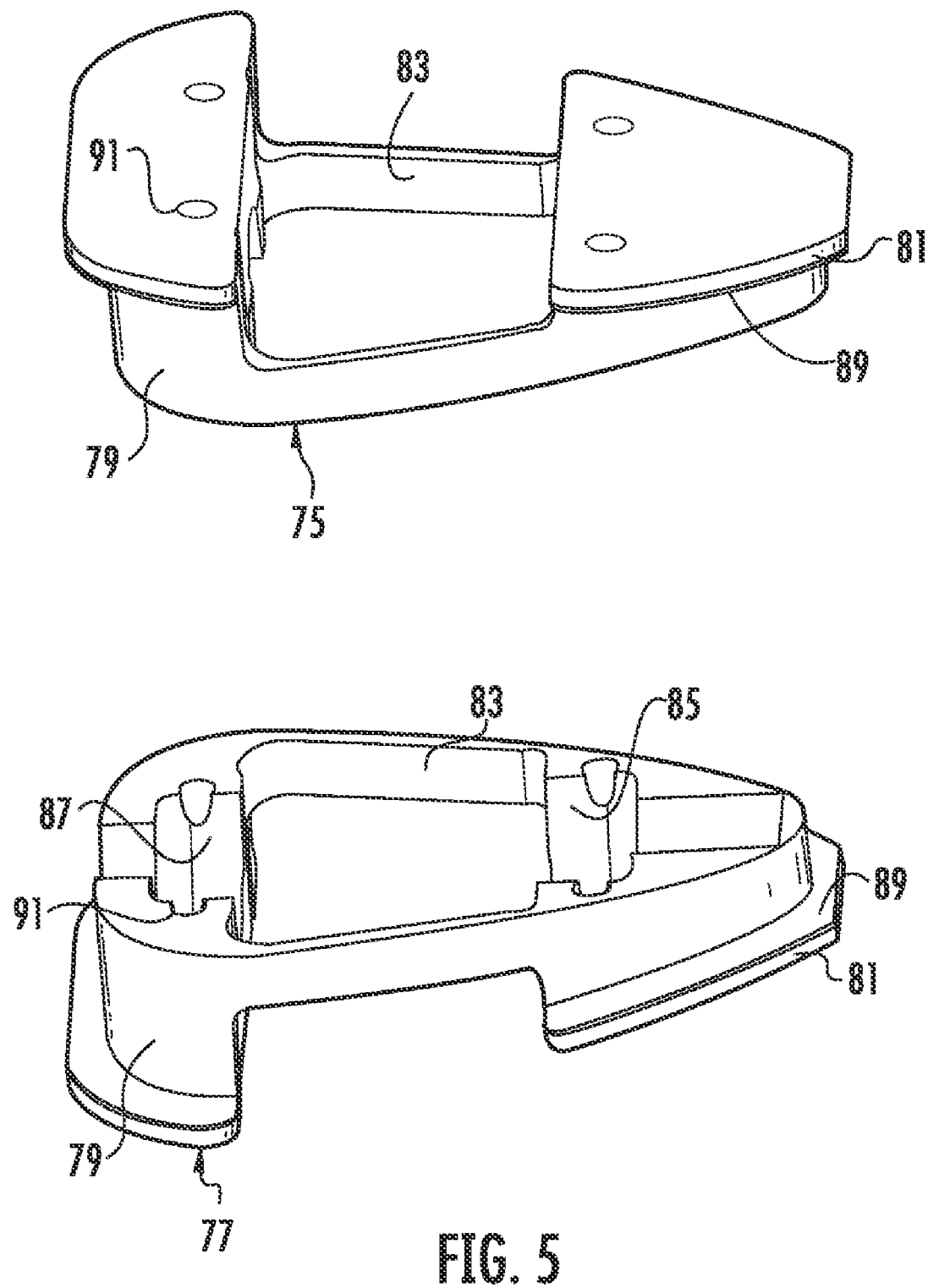
FIG. 5 is an enlarged oblique view of the bearing fitting of FIG. 4.

FIG. 5 is an enlarged view of bearing fitting 73 and shows detail of fitting halves 75, 77. Each half 75, 77 has a body 79 having a generally triangular outer shape that is the same as aperture 67, permitting halves 75, 77 to be closely fit within aperture 67. It should be noted that the inboard end of body 79 has a larger height than the outboard end of body 79 for accommodating the increased inboard thickness of arms 61. A rim 81 extends from an outer edge of each body 79, rims 81 being shaped to match the contour of surfaces 69, 71 for adjoining surfaces 69, 71. Each half 75, 77 has a central opening 83 and at least one portion of at least one bearing mount, such as round mounting cups 85, 87 (visible only in half 77). When halves 75, 77 are joined together, each body 79, opening 83, and cup 85, 87 of one of halves 75, 77 is aligned with the corresponding component in the other of halves 75, 77. Referring also to FIG. 4, two assembled bearing fittings 73 are shown in arms 61, and assembled cups 85, 87 are visible in fittings 73. A thin, preferably Teflon or elastomeric buffer 89 is located on the inner surface of each rim 81, so as to provide for wear reduction and/or cushioning between rims 81 and surfaces 69, 71 of yoke 59 as loads are transmitted from each fitting 73 to yoke 59. Buffer 89 may also be used to provide for preload in the installation of fittings 73.

To install each inboard bearing assembly in a cavity 67, the bearing assembly is inserted in aperture 67, and fitting halves 75, 77 are inserted into aperture 67 from opposite sides of arm 61. Aligned cups 85, 87 provide for mounting of the inboard and outboard ends of the bearing assembly, and aligned openings 83 provide clearance for the remaining portions of the bearing assembly to rotate a limited amount about pitch axis 65 relative to yoke 59. Fitting halves 75, 77 are fastened together using fasteners or other means, so as to create clamping forces between rims 81 and yoke 59 and retain the bearing assembly in a selected position within cavity 67 along pitch axis 65. Halves 75, 77 may be attached together using fasteners (not shown) extending through both halves 75, 77, such as through aligned fastener holes 91.

It should be noted that fitting 73 is described as having two halves 75, 77, though fitting 73 may comprise multiple pieces that are not half of the whole and/or may not mirror the other piece. Also, whereas the surfaces of yoke arms 61 are described as having upper surface 69 and lower surface 71, bearing fitting 73 may be used in yokes in which opposing surfaces of arms 61 are not oriented as shown.

The yoke and bearing fitting assembly described above provides for several advantages, including: 1) eliminating the need for several machining steps on a yoke, which eliminates cost and manufacturing time; and 2) providing for optional use of shims in the installation.

While at least one embodiment has been described, this description is not intended to be construed in a limiting sense. Various modifications and combinations, as well as other embodiments, will be apparent to persons skilled in the art upon reference to the description.

The invention claimed is:

1. A yoke and bearing fitting assembly for a multi-blade aircraft rotor, comprising:
   a yoke having arms extending generally radially from a central portion of the yoke, the arms each having an upper surface and a lower surface an aperture being formed in each arm and extending between the upper surface and the lower surface, the aperture having an inboard and an outboard end; and
   a bearing fitting comprising a body configured for insertion into the aperture of the yoke, such that the bearing fitting extends within the aperture from the inboard end to the outboard end, the bearing fitting having two rims protruding from a periphery of the body, the rim at the inboard end being discontinuous from the rim at the outboard end of the aperture, the bearing fitting also having a bearing mount adapted for mounting a pitch-change bearing assembly to the yoke;
   wherein each rim abuts one of the surfaces of the associated yoke arm when the bearing fitting is installed within the aperture, so as to create clamping forces between the rims and the arm; and
   wherein the bearing fitting is adapted for transmitting forces from the pitch bearing assembly into the yoke.

2. The assembly according to claim 1, wherein the bearing fitting is formed as two pieces.

3. The assembly according to claim 1, wherein the bearing fitting is formed as two halves.

4. The assembly according to claim 1, wherein the bearing fitting is formed as two halves, a rim being located on each half.

5. The assembly according to claim 1, further comprising:
   an elastomeric buffer located between each rim and the adjacent surface of the yoke.

6. The assembly according to claim 1, further comprising:
   a Teflon buffer located between each rim and the adjacent surface of the yoke.

7. A yoke and bearing fitting assembly for a multi-blade aircraft rotor, comprising:
   a yoke having arms extending generally radially from a central portion of the yoke, the arms each having an upper surface and a lower surface an aperture being formed in each arm and extending between the upper surface and the lower surface, the aperture having an inboard and an outboard end; and
   a bearing fitting comprising a body configured for insertion into the aperture of the yoke, such that the bearing fitting extends within the aperture from the inboard end to the outboard end, the bearing fitting having two rims protruding from a periphery of the body, the bearing fitting being formed in at least two pieces, the rim at the inboard end being discontinuous from the rim at the outboard end of the aperture, the bearing fitting having a bearing mount adapted for mounting a pitch-change bearing assembly to the yoke;
   wherein each rim abuts one of the surfaces of the associated yoke arm when the bearing fitting is installed within the aperture, so as to create clamping forces between the rims and the arm; and
   wherein the bearing fitting is adapted for transmitting forces from the pitch bearing assembly into the yoke.

8. The assembly according to claim 7, wherein the bearing fitting is formed as two halves.

9. The assembly according to claim 7, wherein the bearing fitting is formed as two halves, a rim being located on each half.

10. The assembly according to claim 7, further comprising:
    an elastomeric buffer located between each rim and the adjacent surface of the yoke.

11. The assembly according to claim 7, further comprising:
    a Teflon buffer located between each rim and the adjacent surface of the yoke.

12. A bearing fitting for installing a pitch-change bearing in a rotor yoke, the fitting comprising:

a body adapted for insertion into an aperture in an arm of the rotor yoke, the body extending within the aperture from an inboard end of the aperture to an outboard end of the aperture;

two rims protruding from a periphery of the body, each rim contacting an opposing surface of the rotor yoke, the rim adjacent the inboard end being distinct from the rim along the outboard end of the aperture;

a bearing mount adapted for locating a pitch-change bearing assembly within the fitting;

wherein each rim is adapted to abut one of opposing surfaces of the yoke arm when the bearing fitting is installed within the aperture, so as to create clamping forces between the rims and the arm; and wherein the bearing fitting is adapted for transmitting forces from the pitch bearing assembly into the yoke.

13. The bearing fitting according to claim 12, wherein the bearing fitting is formed as two pieces.

14. The bearing fitting according to claim 12, wherein the bearing fitting is formed as two halves.

15. The bearing fitting according to claim 12, wherein the bearing fitting is formed as two halves, a rim being located on each half.

* * * * *